Patented Mar. 6, 1928.

1,661,577

UNITED STATES PATENT OFFICE.

HERBERT RENNER AND JOHANNES RENNER, OF CHICAGO, ILLINOIS.

COMPOSITION FOR TREE TREATMENT.

No Drawing. Application filed March 18, 1927, Serial No. 176,586, and in Germany April 22, 1925.

This invention relates to the preservation, dyeing and/or fireproofing of the wood of standing living trees, and requires for its understanding a brief consideration of the ordinary principles used heretofore in preserving or dyeing standing timber before it is felled: According to the previous methods solutions of chemicals are introduced into incisions made in the living tree with the result that the circulatory sap system of the tree carries said solutions up to the leaves under the influence of the natural transpiration of the foliage. But we have by study and experiment demonstrated that the aforementioned methods are exceedingly expensive when used for commercial purposes as they entail a great deal of inevitable expense, first in the labor required to fill the tank attached to each tree under work with solution and keep it filled therewith, second in the time and labor required to watch each tree under work in order to prevent the air from entering the incisions in the tree, third in the labor required to keep, for any emergency, an adequate supply of clean water or solution, fourth in the labor required to carry along a very large stock of valuable materials such as tanks, stands, rubber tubing, stoppers, pumps etc. Besides this, all these methods of treating standing trees with artificially supplied solutions cannot be carried out at all where, due to the conditions of the country or the soil the necessary water-supply is not large enough or entirely lacking.

Subject matter of our invention is a new composition for tree treatment for the purpose of preserving, dyeing and/or fireproofing timber, and the use of which composition does not require any artificial water supply whereby the above-mentioned objections against the ordinary methods are obviated:

The composition according to our invention is to be introduced into the natural circulatory sap system of a tree in order to introduce chemicals to the sap while the latter is raised by the transpiration of the foliage. In order to enable the natural sap flowing up through the tree roots to the leaves to perform the task of dissolving the chemicals the said composition, first, should be porous or permeable, i. e. it should not offer any considerable resistance against the upward-movement of the sap, and, second, should be expansible in order to prevent the formation of empty spaces within the tightly packed material under the influence of water or sap dissolving the chemicals contained therein.

Numerous experiments have proved that a compound consisting of a uniform mixture of saw-dust and comminuted chemicals soluble in water or sap of a tree fulfills both said requirements.

In using our composition for tree treatment incisions within the sap wood of a standing living tree (transversally of its base) preferably forming chambers with plano-parallel walls are packed tightly with a composition according to this invention which is prepared by adding to a certain amount of saw-dust a measured amount of one or more non-hygroscopic chemical compounds soluble in water or natural sap of a tree and useful for preserving, dyeing and/or fireproofing wood. Said ingredients are mixed with a quantity of water or of a solution of said chemicals in water, sufficient to form some kind of a plastic material ready for use in the way mentioned above.

To illustrate one concrete instance, the interstitial preservation of balsam fir by means of our composition may be described:

In order to introduce say $N=4$ kilograms of crystallized copper-sulphate per 1 cubic meter (cbm.) of sap-wood, a compound shall be used which consists of 2 kilograms of sulphate of copper, 1 kilogram of saw-dust, both ingredients passing a 20-mesh screen, and 750 cc. of water or preferably saturated solution of copper-sulphate in water.

This mixture may show the "filling volume" $f=1.95$ liters, i. e. 1 kg. of copper-sulphate prepared in the way just described has—if packed tightly—a volume of $f=1.95$ liters. The height of the tree may amount to $H=16$ meters, its diameter (0.30 meters above the ground) to $D=0.35$ meters and the average width of the sap-wood area $s=0.10$ meters. The width W—expressed in centimeters—of the chamber or holes will be found to be $W=3.7$ or 4 cm. approximately by the aid of the formula:

$$W = \frac{N \times f \times H}{60(D-s)}(3D - 6s - 4s^2) \text{ centimeters}$$

which one of us (H. R.) developed for practically applying our compositions.

Still another way of preparing compositions according to this invention may be described:

A great deal of the expenses of the tree treatment may be eliminated by forming any composition according to this invention into substantially solid but still water-pervious bodies preferably of disc-like shape and standard size which can be cut with a knife without any difficulty. Such plates may be produced in a centralized plant, and the use of such plates would do away with the necessity of preparing the compositions in the forest resulting in a considerable saving of machinery, equipment, tools, labor and waste and an increased reliability of the process of tree treatment.

Other specific examples of the principles of our invention might be given but this will suffice.

The chambers within the tree after being packed closely with said compositions in the way described above are then tamped or closed by impervious strips or plastic or both, and the tree is hereafter left to the action of the natural phenomena of tree growth.

As stated above our compositions are limited to the use of non-hygroscopic chemicals as in the presence of water or small amounts of moisture hygroscopic salts change into oily liquids showing no diffusibility through the cell membranes of green wood.

The compositions thus introduced into the natural sap circulatory system are, due to their porosity, permeated by the sap flowing up through the tree roots to the leaves. In permeating said compositions the sap dissolves the chemicals contained therein. The sap leaving the "filters" will show a certain maximum concentration of chemicals characteristic for each composition. The dissolving action of the sap would obviously result in the development of empty spaces within the tightly packed compositions if the saw-dust would not expand automatically to compensate the loss of volume due to the action of the sap dissolving the chemicals. By this combined action between the sap and the saw-dust any transverse circulation of sap or solution within the said incisions is made impossible resulting in the uniform saturation of the sap-wood of a tree with solutions of equal concentrations.

While we have described what we now believe to be the preferred embodiment of our invention we do not limit ourselves to the specific methods for preparing the new compositions for tree treatment herein described as we consider that numerous modifications may be made without departing from the essence of the invention.

What we claim is:

1. A composition for tree treatment consisting of a mixture of saw-dust and one or more non-hygroscopic chemicals soluble in water or natural sap of a tree and useful for preserving, dyeing and/or fireproofing wood.

2. A composition for tree treatment consisting of a mixture of saw-dust and one or more non-hygroscopic chemical compounds soluble in water or natural sap of a tree and useful for preserving, dyeing and/or fireproofing wood, to which mixture water or a solution of said chemicals in water is added.

Dr. HERBERT RENNER.
JOHANNES RENNER.